US012748315B2

(12) United States Patent
Suehle

(10) Patent No.: US 12,748,315 B2
(45) Date of Patent: Sep. 29, 2026

(54) SYSTEM AND METHOD FOR GENERATING A SINGLE LIGHT BEAM FROM A PLURALITY OF LIGHT SOURCES

(71) Applicant: ADVANCED ENTERTAINMENT TECHNOLOGIES, INC., Curtis Bay, MD (US)

(72) Inventor: John S. Suehle, Westminster, MD (US)

(73) Assignee: ADVANCED ENTERTAINMENT TECHNOLOGIES, INC., Curtis Bay, MD (US)

( * ) Notice: Subject to any disclaimer, the term of this patent is extended or adjusted under 35 U.S.C. 154(b) by 61 days.

(21) Appl. No.: 18/787,286

(22) Filed: Jul. 29, 2024

(65) Prior Publication Data

US 2025/0035944 A1 Jan. 30, 2025

Related U.S. Application Data

(60) Provisional application No. 63/529,553, filed on Jul. 28, 2023.

(51) Int. Cl.

| | |
|---|---|
| ***G02B 26/00*** | (2006.01) |
| ***F21V 5/00*** | (2018.01) |
| ***F21V 9/20*** | (2018.01) |
| ***F21V 9/40*** | (2018.01) |
| ***G02B 27/10*** | (2006.01) |
| ***G02B 27/30*** | (2006.01) |
| *F21Y 115/30* | (2016.01) |

(52) U.S. Cl.

CPC ............ *G02B 27/106* (2013.01); *F21V 5/007* (2013.01); *F21V 5/008* (2013.01); *F21V 9/20* (2018.02); *F21V 9/40* (2018.02); *G02B 26/008* (2013.01); *G02B 27/30* (2013.01); *F21Y 2115/30* (2016.08)

(58) Field of Classification Search

CPC .............................. G02B 26/008; F21V 5/007

See application file for complete search history.

(56) References Cited

U.S. PATENT DOCUMENTS

2017/0074489 A1* 3/2017 Jurik ..................... F21V 29/763
2020/0103097 A1 4/2020 Kinzer et al.

FOREIGN PATENT DOCUMENTS

| | | | |
|---|---|---|---|
| CN | 114901991 | A | 8/2022 |
| EP | 2516920 | B1 | 11/2019 |
| EP | 3282180 | B1 | 11/2020 |
| WO | 2013/142434 | A2 | 9/2013 |

OTHER PUBLICATIONS

International Search Report and Written Opinion, PCT/US2024/039998, dated Dec. 3, 2024, 8 pages.

* cited by examiner

*Primary Examiner* — Sean P Gramling

(74) *Attorney, Agent, or Firm* — Nelson Mullins Riley & Scarborough LLP; Anthony A. Laurentano

(57) ABSTRACT

An illuminator to provide a collimated beam of light is disclosed. The illuminator includes light source modules. Each of the light source module includes a light source to emit a light, an optical lens to collect and direct the light from the light source and to output the light along a path, a color filter disposed adjacent to the optical lens and in the path of the light, in which the color filter produce a filtered light, and a collimator lens to collect and direct the associated filtered light. The collimator lenses of the light source modules direct and output each of associated filtered lights into a major collimated light beam along a major optical axis.

20 Claims, 2 Drawing Sheets

SYSTEM AND METHOD FOR GENERATING A SINGLE LIGHT BEAM FROM A PLURALITY OF LIGHT SOURCES

CROSS-REFERENCE

This non-provisional utility patent application claims priority to U.S. provisional patent application Ser. No. 63/529,553, filed Jul. 28, 2023, entitled "SYSTEM AND METHOD FOR GENERATING A SINGLE LIGHT BEAM FROM A PLURALITY OF LIGHT SOURCES," the contents of which are herein incorporated by reference herein.

BACKGROUND

This present invention generally relates to the field of lighting systems including illuminating apparatuses, or illuminators, that generate a beam of light from one or more light sources. In particular, the present invention relates to an illuminator and associated method for generating a collimated beam of light using multiple light sources.

Architectural lighting plays an important role in enhancing the aesthetics, functionality, and ambiance of selected structures and spaces. Historically, incandescent bulbs and halogen lamps were the primary lighting sources employed in architectural settings. These illuminators offered warm and soft lighting, creating a pleasant environment. However, they exhibited significant drawbacks that limited their overall effectiveness. These traditional types of light sources consume large amounts of energy, most of which is used to generate heat. As such, the incandescent and halogen types of bulbs are costly to operate. Further, these traditional types of bulbs have relatively short life spans, necessitating frequent replacements. This results in maintenance hassles and increased expenses for building owners and operators.

In the realm of entertainment, lighting plays an important role in creating captivating and immersive experiences for the audience. Conventionally, incandescent lamps, halogen lamps, fluorescent tubes, and various forms of discharge lamps, like high-intensity discharge (HID) lamps, are employed to achieve different lighting effects in concerts, theaters, and other entertainment venues. These traditional illuminators lack precise control mechanisms, thus limiting the ability to dynamically adjust color, intensity, and beam angles of the light sources during performances or events.

Further, current solid-state lighting technology including light emitting diodes (LED) and laser stimulated phosphor devices can produce lighting that is brighter and many times more efficient than traditional incandescent light sources. For example, high powered search lights used in architectural and entertainment applications typically use high pressure xenon bulbs that require up to 10 kW of electrical service. These conventional xenon lighting units are, however, large, heavy, and produce a great amount of heat. Colorization and dimming of the output beam require large, motorized devices to insert apertures or dichroic films across the output beam.

In view of the foregoing drawbacks associated with conventional lighting sources, there exists a need in the art for innovative lighting technology that overcomes these limitations and presents a sustainable, efficient, and versatile solution for architectural and entertainment applications.

SUMMARY

This summary is provided to introduce a selection of concepts in a simplified form that are further described in the Detailed Disclosure.

According to one embodiment, the radiation emitting system of the present invention includes a plurality of radiation sources that emit radiation of one or more types in one or more wavelength ranges of the electromagnetic spectrum. For example, the radiation sources can include one or more light emitting sources that emit radiation in a visible radiation range, which can include light in the wavelength range of between about 380 nm to about 750 nm. The radiation sources can include sources that emit radiation in different wavelength ranges. The radiation sources can emit radiation in an infrared wavelength range, such as a wavelength range of between about 700 nm to about 1 mm. According to another embodiment, the radiation sources can emit radiation in an ultraviolet wavelength range, such as a wavelength range of between about 10 nm to about 750 nm. According to still other embodiments, the radiation sources can emit radiation in any combination of these wavelength ranges.

According to one embodiment of the present invention, the system of the present invention is directed to a lighting system that includes a plurality of light sources that are integrated and arranged together to produce a single light beam, such as a single collimated light beam. The single beam light beam can produce a beam as bright as a search light using selected lighting sources, such as xenon based light sources. The lighting system of the present disclosure can thus produce a single light source that is equal to or greater in brightness than commercially available sources, such as for example xenon light sources.

In one example, the present invention is directed to an illuminator or lighting system that provides a collimated beam of radiation, such as light. The illuminator includes a plurality of light source modules. Each of the plurality of light source modules includes a light source configured to emit light, an optical lens configured to collect and direct the light from the light source and to output the light along an optical path, a color filter disposed adjacent to the optical lens and in the path of the light, in which the color filter is configured produce a filtered light, and a collimator lens configured to collect and direct the associated filtered light. The collimator lenses of the plurality of light source modules are configured to direct and output each of associated filtered lights into a single major collimated output light beam along a major optical axis. The major collimated light beam is the totality of the collimated beams of lights generated by the light source modules.

In another example, the present invention is directed to a method for providing a collimated beam of light. The method includes generating a plurality of filtered lights, wherein each filtered light is generated with a plurality of light source modules, each light source module having an associated light source. Generating each filtered light includes emitting light from the associated light source, collecting and directing the light from the light source along an optical path with a lens, and filtering the light from the lens with a color filter disposed in the path to output the filtered light. The filtered lights are individually collected and directed into a single major collimated output light beam along a major optical axis.

In still another example, the disclosure is directed to an illuminator that provides a collimated beam of light. The illuminator includes a plurality of light source modules. Each of the plurality of light source modules includes a light source having a super-luminescent diode configured to emit light, an optical lens configured to collect and direct the light from the light source and to output the light along a path, a color wheel assembly having a color wheel comprising a plurality of color filters, each color filter configured to be disposed adjacent to the optical lens and in the path of the light, the color filter disposed in the path of the light configured produce a filtered light, and a collimator lens configured to collect and direct the associated filtered light. The collimator lenses of the plurality of light source modules are configured to direct and output each of associated filtered lights into a single major collimated output light beam along a major optical axis.

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

These and other features and advantages of the present disclosure will be more fully understood by reference to the following detailed description in conjunction with the attached drawings in which like reference numerals refer to like elements through the different views. The drawings illustrate principals of the invention and, although not to scale, show relative dimensions.

Figure 1:
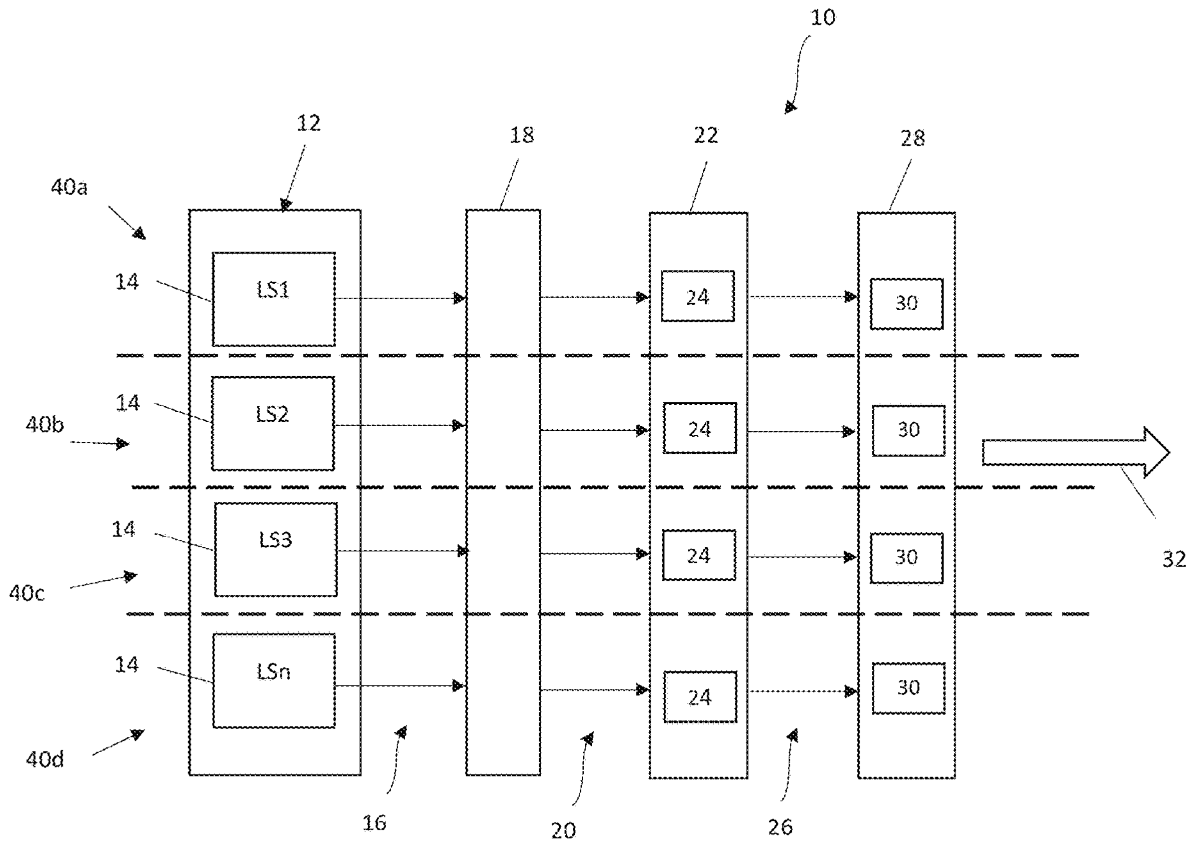
FIG. 1 is a schematic block diagram of a lighting system, or illuminator, according to the teachings of the present invention.

While the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION OF THE INVENTION

For purposes of promoting an understanding of the principles of the present disclosure, reference is now made to the examples illustrated in the drawings, which are described below. The illustrated examples disclosed herein are not intended to be exhaustive or to limit the disclosure to the precise form disclosed in the following detailed description. Rather, these exemplary embodiments were chosen and described so that others skilled in the art may use their teachings. It is not beyond the scope of this disclosure to have a number (e.g., all) the features in a given example used across all examples. Thus, no one figure should be interpreted as having any dependency or requirement related to any single component or combination of components illustrated therein. Additionally, various components depicted in a given figure may be, in examples, integrated with various ones of the other components depicted therein (and/or components not illustrated), all of which are considered to be within the ambit of the present disclosure.

The present invention is directed to a lighting system that employs multiple different light sources that are mechanically and optically combined to produce a single collimated output light beam.

FIG. 1 illustrates an illuminator or lighting system 10 of the present disclosure. The illuminator 10 includes a plurality of subsystems such as a light source subsystem 12, a first optical subsystem 18, a filtering subsystem 22, and a second optical subsystem 28. In one embodiment, the light source subsystem 12 is configured to emit radiation 16, in the visible light wavelength range (e.g., light). The first optical subsystem 18 is configured to collect the light 16 from the light source subsystem 12 and direct the light along an optical path 20 to the filtering system 22. In an embodiment, the first optical subsystem 18 includes an optical lens device, which can comprise one or more optical lenses. The filtering subsystem 22 is configured to receive the light from the first optical subsystem 18 and produce or output a filtered light 26 to the second optical subsystem 28. The second optical subsystem 28, collects the filtered light 26 and directs the filtered lights into a single major collimated output light beam 32 along a major optical axis.

Figure 2:
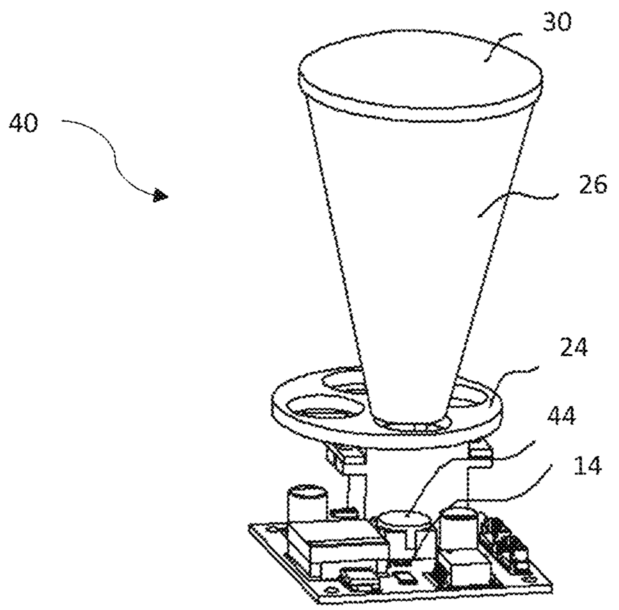
FIG. 2 is a perspective view of a lighting subsystem of the lighting system, or module of the illuminator, of FIG. 1 according to the teachings of the present invention.
Figure 3:
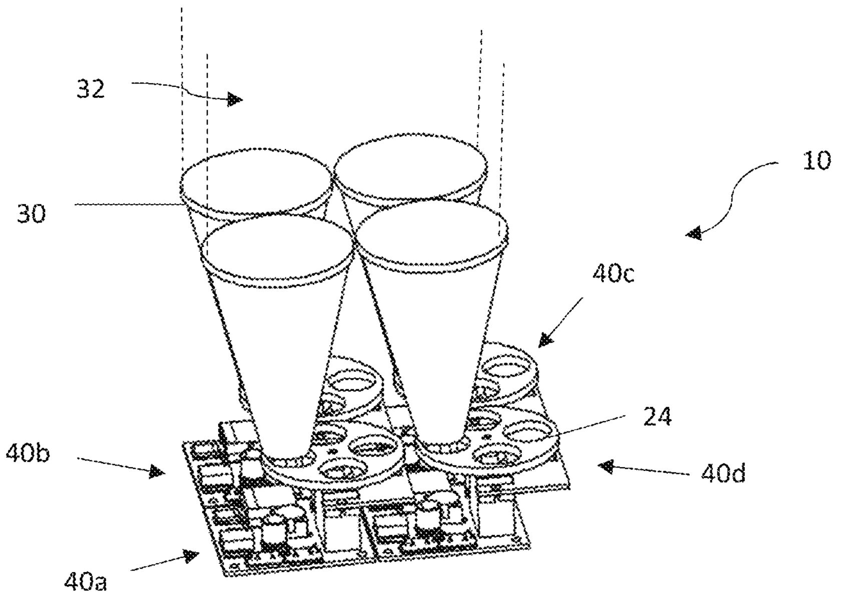
FIG. 3 is a perspective view of the lighting system or illuminator o FIG. 1 according to the teachings of the present invention.

In one embodiment, the illuminator 10 is configured as a plurality of light source modules 40, such as light source modules 40*a*, 40*b*, 40*c*, 40*d*. In embodiments, each module 40 includes an element from the plurality of subsystems 12, 18, 22, 28. In one embodiment, each module 40 includes an element from more than a plurality of subsystems 12, 18, 22, 28. For example, each module 40 can include an element from each of the subsystems 12, 18, 22, 28. Accordingly, a module can include an element from the light source subsystem 12, the first optical subsystem 18, the filtering subsystem 22, and the second optical subsystem 28. FIG. 2 illustrates an example of a module 40. A plurality of light source modules 40, such as two or more light source modules, are coupled together to form the illuminator 10. FIG. 3 illustrates an example illuminator 10 constructed of four light source modules 40*a*, 40*b*, 40*c*, 40*d*. In some embodiments, the plurality of modules are coupled together to form a spot light or a search light.

As illustrated in FIG. 1, the light source subsystem 12 includes any selected number of radiation sources suitable for generating radiation. According to one embodiment, the light source subsystem 12 employs a series of light sources 14 that generate light in one or more selected wavelength ranges, such as in the range between about 380 nm and about 750 nm. The light sources can include any selected type of light source, and example light sources include xenon arc lamps, light emitting diodes (LEDs), phosphor lighting units, fluorescent bulbs, incandescent bulbs, halogen bulbs, plasma lamps, sodium vapor lamps, carbon arc lamps, tungsten-halogen lamps, metal halide lamps, electroluminescent devices. The light sources 14 can generate, for example, light having the same wavelength or wavelength range or light having different wavelengths or wavelength ranges. As shown, the light source subsystem 12 can include a series of lighting units 14, each of which produces output light 16.

The output light 16 generated by the light sources 14 can be optically transmitted to and captured by a first optical subsystem 18. The first optical subsystem 18 can include an optical lens 44. In one embodiment, each module 40 includes a separate optical lens 44. In other embodiments, two or more modules 40 can share a single optical lens 44 from the first optical subsystem 18. The optical lens 44 can be configured to include one lens or compound lenses (two or more lenses configured along a common optical axis).

The optical lens 44 can be configured or controlled to manipulate the light passing therethrough. For example, the lens 44 forming part of the first optical subsystem 18 can include a convex lens for converging the light passing therethrough, a concave lens for diverging the light passing therethrough, a meniscus or cylindrical lens for converging or diverging the light based on orientation, a plano-concave lens, a double-concave lens, and a combination of lenses.

According to one embodiment, the optical lens 44 is a bi-convex spherical lens. The bi-convex spherical lens is symmetrical in shape and has two curved surfaces that are both convex (e.g., outwardly curved). The lens can be formed from two spherical surfaces, each having a constant curvature throughout its surface. When viewed from a side, the lens resembles a thick middle section that tapers towards the edges. The lens can function as a converging lens by concentrating or bringing parallel rays of light that pass therethrough closer together at a specific focal point. The lens 44 thus serves to collect the highly divergent light emanating from the light source 14 and focuses the light into an initial or primary beam. For instance, the optical lens 44 outputs the primary beam of light 20. The lens can capture a significant portion of the light, such as greater than 95% of the light, and optionally greater than 98% of the light generated by the associated light source 14.

The light 20 emitted or output by the first optical subsystem 18 is configured as a primary beam and is directed along an optical path to and received by a filtering subsystem 22 that can include a light filter. The light filter is applied to condition the light 20 prior to applying it to the second optical subsystem 28. In some embodiments, the light filter is a color filter that has been treated to selectively transmit a desired wavelength of light and to restrict another wavelength of light. For example, the filters can be configured as dichroic filters that can transmit specific wavelengths of light while absorbing or blocking other wavelengths of light. In one example, the light filter is configured as a color filter such as red filter configured to transmit red colored light, a green filter configured to transmit green colored light, and a blue filter configured to transmit blue colored light. In one embodiment, each module 40 includes a separate color filter. In other embodiments, two or more modules 40 can share a single-color filter from the filtering subsystem 22.

In some embodiments, the color filter applied to the light 20 is selected from a set of a plurality of color filters that can be applied to the light. For example, a module 40 can include a plurality of color filters, and one color filter from the plurality of color filters is applied to the light 20. In one example, a module 40 includes a red filter, a green filter, and a blue filter, and, for example, a clear or transparent (white) filter in a set of a plurality of color filters. In one example, one filter of the set of the plurality of color filters can be applied to the light 20 at a time.

In some embodiments, the filtering subsystem 22 includes a color wheel assembly. For example, each module 40 can include a separate color wheel assembly. In other examples, In other embodiments, two or more modules 40 can share a single color wheel assembly from the filtering subsystem 22. The color wheel assembly includes a color wheel 24, which includes a set of the color filters. For instance, the color wheel 24 can include a disk-shaped device that is configured to filter, control or vary the color of light passing through a selected one of the color filters. In some examples, the color wheel is a circular disk with different colored segments or portions that can be arranged in a specific pattern. For example, the color wheel 24 can be divided into multiple different segments, each segment including a different color filter. The colored segments having different colors can be arranged in a particular sequence around the disk. The order in which the colored filter segments are arranged ensures that the correct colors are presented at the appropriate time for image projection or display. The color wheel 24 can be mounted on a support device, such as a rotating spindle, that allows the color wheel to spin as needed. In some embodiments, the color wheel assembly can be controlled, such as by a controller or processing device, to rotate a selected color filter of the color wheel 24 into the path of the light or the primary beam of the module at a selected time. In some embodiments, each color wheel 24 of the filtering subsystem can be separately controlled to separately select a filter. In an example in which each module 40 includes a separate color wheel, each color wheel can be controlled separately to produce a separate filtered light, and the filtered lights are mixed in the collimated beam 32.

The filtered light 26 emitted or produced by the filtering subsystem 22 is then transmitted to a second optical subsystem 28 that can include a series of optical elements 30 that can be configured to manipulate the filtered light 26 passing therethrough. The optical elements 30 can include one or more lens that can cooperate to form, as an output, a single output collimated light beam 32. The optical elements can include a collimator lens, such as a plano-concave or double-concave lens, that converts a diverging (e.g., spreading) input light beam (e.g., filtered light 26) into a single, integrated, parallel major beam of light 32 along a major optical axis with low divergence (e.g., less than a 2 degrees of spread).

FIG. 1 also illustrates a method of the illuminator or combination of the subsystems 12, 18, 22, 28. A plurality of filtered lights 26 are generated. Each filtered light 26 of the plurality of filtered lights is generated with a light source module 40, and each light source module include and associated light source 14. Each filter light 26 of the plurality of filtered lights includes emitting a light 16 from the associated light source 14, collecting and directing the light from the light source 16 along a path, such as the primary beam 20, with an optical lens 44 of the first optical subsystem 22. The primary beam 20 is filtered with a color filter, such as set of color filters on a color wheel 24, disposed in the path to output the filtered light. Each of the filtered lights 26 is individually collected and directed into a single major collimated output light beam 32. For instance, a collimator lens 30 is configured to collect and direct the associated filtered light of a module 40, and the collimator lenses of the plurality of light source modules are configured to direct and output each of associated filtered lights into a major collimated light beam 32 along a major optical axis. In one example, the primary beam of light 20 for each module is filtered and ultimately collimated into the major or total beam of light 32.

FIG. 2 illustrates an embodiment of a light source module 40. The embodiment of the light source module 40 includes an element from each of the light source subsystem 12, the first optical subsystem 18, the filtering subsystem 22, and the second optical subsystem 28. In the illustrated embodiment, the light source module includes a light source 14 configured to emit a light 16. For example, the module 40 can include one light source or a plurality of light sources to emit the light 16. An optical lens 44 is disposed adjacent to the light source 14 and configured to collect and direct the light 16 from the light source 14 and to output light 20 such as a primary beam of light for the module along an optical path of an optical axis of the module 40 to the color filter 24. In the illustrated embodiment, the module 40 includes a color filter implemented as a color wheel 24 having a plurality of selectable color filters. The color wheel 24 is included as part of a color wheel assembly on the module 40 that can selectively dispose, such as rotate, a color filter into the path of the output light 16. The color wheel 24 in the illustrated embodiment includes four circular color filters, such as a red filter, a green filter, a blue filter, and a transparent or white filter. The color wheel 24 is rotatable about an axis generally parallel to the path of the light 20, or optical axis, for the light source module 40. The filtered light 26 is provided to a collimator lens 30 configured to collect and direct the filtered light 26. The light source 14, optical lens 44, color wheel 44, and collimator lens 30 are mechanically and optically coupled together in a known way.

In the illustrated example, the light source 14 is configured as a super-luminescent diode (SLD) on an integrated circuit. As known in the art, an SLD is an optical device that provides an output light similar to a laser diode (LD) and low coherence and wide oscillation spectrum similar to an LED. In one embodiment, the light source 14 includes a phosphor type light source that is relatively small in size, such as smaller than about 5 $mm^2$, and preferably smaller than 1 $mm^2$. The SLD can be configured as a laser diode, such as a blude laser diode, stimulating a white phosphor to produce a white light. The SLD can be configured as a surface mounted device (SMD) on a relatively small integrated circuit, such as on a 7 mm by 7 mm integrated circuit substrate. In one example, each module includes a 7 mm-by-7 mm footprint on a circuit board. In one example, each SLD can produce 1000 lumens of white light as light 16 via 18 Watts of power applied to the integrated circuit. In one embodiment, each module 40 includes one or more SLDs. For example, each module 40 can include one SMD having a single SLD on the substrate. An example of a SMD includes a device available under the trade designation Kyocera SLD Laser. The light source 14 can be formed on a suitable substrate or base that includes associated electronics for controlling the light source as well as other portions of the module 40. For example, the substrate or base can include electronics and a mechanism to operate the color wheel 24 and selectively position a color filter within the light 20 from the optical lens 44. In one example, the module includes a single light source 14. In other examples, multiple light sources such as multiple SLDs can be configured on the module 14.

The optical lens 44 can include one or more lenses disposed in the path of the optical axis adjacent to the light source 14 or, in some examples, arranged on the module above the light source 14. In the illustrated example, the optical lens 44 includes a convex lens or convex surface to capture and converge the light 16 emitted from the SLD. In the illustrated example, the optical lens is a bi-convex spherical lens. In one example, the optical lens includes a single lens element positioned over the SLD to capture the light emitted from the SLD. The optical lens 44 can be configured to provide a cone of light on the optical axis as a primary beam of light for the module.

In the illustrated example, the filtered light 26 output from the color wheel 24 includes a diverging beam of light, such as filtered light 26 within a cone angle from the optical axis, provided to the collimator lens 30. In the illustrated example, the color wheel is disposed on the module vertical to the optical lens 44. In the illustrated example, each color filter on the color wheel is circular in shape and configured to have a diameter large enough to capture all of the light in the primary beam. In this configuration, the maximum amount of light is passed from the color filter to the collimating lens 30.

The collimator lens 30 can include one or more lenses in the optical axis of the module 40 to collect the filtered light 26 within the cone angle. In one embodiment, the collimator lens 30 includes a plano-concave or double-concave lens.

FIG. 3 illustrates an example illuminator 10 constructed of light source modules 40*a*, 40*b*, 40*c*, 40*d*. In the illustrated example, each light source module is tiled together to form the illuminator 10. Other configurations of the illuminator are possible, which can include more than two modules including more than the four illustrated modules. In the illustrated example, each module 40 is similarly configured with components, such as having a light source 14 configured from an SLD, an optical lens 44, a color wheel assembly including a color wheel 24 with a plurality of light filters and associated electronics and mechanisms to operate the color wheel assembly and dispose one of the filters on the color wheel 24 within the light 20 output from the lens 44, and a collimator lens 30 to collect the filtered light 26 and direct and output the filtered light into the major collimated light beam output from the illuminator 10. In one embodiment, each of the components, such as light source 14, optical lens 44, color wheel 24, and collimator lens 30 are configured mechanically and optically, such as spaced apart along the optical axis and within the footprint of the SMD so as to provide for an operable, scalable illuminator 10 comprising a plurality of modules. For instance, each module is configured so that the components do not interfere with the operating of an adjacent module. As illustrated, the color wheel 24 of one module overlaps the footprint of another module in the illuminator 10, but does not interfere with the operation of the another module. The modules can be assembled together in any form. In one embodiment, the modules 40 are disposed on a base such as a circuit board or other base into an operational illuminator 10. In the illustrated example, each module is on a generally square SMD. The four modules 40*a*, 40*b*, 40*c*, 40*d* are titled together to form a larger square. The modules 40 can be pre-manufactured and tiled together to form or approximate a square or to approximate a circle.

In the illustrated embodiment, each module 40 of the illuminator 10 includes a collimator lens 30. Each collimator lens 30 is configured to cooperate with the other collimator lenses of the illuminator to form a single major collimated output light beam 32. For example, each of the collimator lenses 30 of the plurality of light source modules 40 of the illuminator are configured to direct and output each of associated filtered lights into a major collimated light beam at a distance. In some embodiment, the addition of a light source module 40 in the construction of the illuminator 10 can include the adjustment of the collimator lens 30 in a pre-manufactured module to form the major collimated light beam more efficiently. The final brightness of the major collimated light beam 32 is additive based on the number of modules 40 included in the illuminator and is dependent on the number of modules. In some embodiments, the illuminator 10 is configured as a relatively high powered spotlight or a search light.

In some embodiments, each color wheel can be independently operated, such as via a controller, to selectively dispose a color filter within the initial or primary beam of light 20 in each module 40 of the illuminator 10. The color wheels 24 can be controlled to select or mix one or more colors of the emitted light 20 that passes therethrough to select a specific light color or to create colors through color mixing. For example, one module, such as module 40*a*, can be configured to dispose the red filter within the associated primary beam 20 and to output a red light. Another module, such as module 40*b*, can be configured to dispose the blue filter within its associated primary beam of light and to output a blue light. The output red light for one module 40*a* and the output blue light from the other module 40*b* can be combined to produce a magenta-colored light in the single major collimated beam. In another example, one module, such as module 40*a*, can be configured to dispose the green filter within the associated primary beam 20 and to output a green light. Another module, such as module 40*b*, can be configured to dispose the blue filter within its associated primary beam of light and to output a blue light. The output green light for one module 40*a* and the output blue light from the other module 40*b* can be combined to create cyan colored light. The color wheel 24 can also be employed to adjust the color balance of the light or to create contrast between selected colors.

High power search lights used in architectural and entertainment applications typically use high pressure xenon bulbs that require up to 10 kW of electrical service. These units are large, heavy, and produce a great amount of heat. Colorization and dimming of the output beam requires large motorized devices to insert apertures or dichroic films across the output beam. The illuminator 10 of the present disclosure, constructed from a plurality of modules having components selected from a plurality of lighting subsystems, is configured to produce a search light equal to or higher in brightness than commercially available xenon lamp products that also provides for at least a fifteen times reduction in electrical power need over the xenon lamp product, a five times decrease in size of the illuminator over a xenon lamp search light, a ten times decrease in overall system weight, while still providing a direct modulation of beam intensity at frequencies up to 50 Khz, fast color modulation with color blending, and scalability.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

Having described the invention, what is claimed as new and desired to be secured by Letters Patent is:

1. An illuminator to generate a collimated beam of light, the illuminator comprising:

a light source subsystem having a plurality of light source modules, wherein each of the plurality of light source modules extends along an optical axis and includes:

a light source configured to emit light;

an optical lens configured to collect and direct the light from the light source and to output the light along an optical path that extends along the optical axis;

a color filter disposed adjacent to the optical lens and in the optical path of the light, the color filter configured to produce a filtered light; and a collimator lens configured to collect and direct the associated filtered light to form a collimated light beam;

wherein the collimator lenses of the plurality of light source modules are configured to direct and output each of the associated collimated light beams into a collective major collimated light beam along a major optical axis, wherein each of the collimator lenses is fixed relative to the corresponding optical axis of the respective light source module; and wherein the collimator lenses of the plurality of light source modules are arranged such that the collimated light beams of the plurality of light source modules overlap and combine to form the collective major collimated light beam propagating along the major optical axis.

2. The illuminator of claim 1, wherein the filtered light collected at the collimator lens for each of the plurality of light source modules is a diverging beam.

3. The illuminator of claim 2, wherein each of the plurality of light source modules includes a color wheel assembly having a color wheel, and wherein the color filter is included in the color wheel as one of a plurality of color filters, wherein each of the color filters of the color wheel is selectably positionable within the path of the light to filter the light for each of the plurality of light source modules.

4. The illuminator of claim 3, wherein the color wheel is rotatable about an axis generally parallel to the path of the light for each of the plurality of light source modules.

5. The illuminator of claim 3, wherein the plurality of color filters includes a red filter, a green filter, a blue filter, and a transparent filter for each of the plurality of light source modules.

6. The illuminator of claim 3, wherein the color filter is a dichroic filter.

7. The illuminator of claim 1, wherein each of the collimator lenses of the plurality of light source modules are disposed to converge each of the associated filtered lights.

8. The illuminator of claim 7, wherein each of the light sources is a super-luminescent diode.

9. The illuminator of claim 8, wherein the light source includes a blue laser diode stimulating a white phosphor to produce a white light emitting from the light source.

10. The illuminator of claim 4, wherein the collimated light beam diverges with less than two degrees of spread.

11. A method for providing a collimated beam of light, the method comprising, providing a light source subsystem having a plurality of light source modules, wherein each of the plurality of light source modules extends along an optical axis and includes a light source configured to emit light;

an optical lens configured to collect and direct the light from the light source and to output the light along an optical path that extends along the optical axis;

a color filter disposed adjacent to the optical lens and in the optical path of the light, the color filter configured to filter the light to produce a filtered light; and a collimator lens configured to collect and direct the associated filtered light to form a collimated light beam;

directing and outputting each of the associated collimated light beams with the collimator lenses of the plurality of light source modules into a collective major collimated light beam along a major optical axis;

fixing each of the collimator lenses relative to the corresponding optical axis of the respective light source module; and arranging the collimator lenses of the plurality of light source modules such that the collimated light beams of the plurality of light source modules overlap and combine to form the collective major collimated light beam propagating along the major optical axis.

12. The method of claim 11, wherein the light source includes a super-luminescent diode, further comprising emitting the light from the super-luminescent diode.

13. The method of claim 11, wherein filtering the light with the light source includes applying one of a plurality of color filters to the light from the lens for each of the filtered lights, wherein the plurality of color filters includes a red filter, a green filter, a blue filter, and a transparent filter.

14. The method of claim 13, further comprising configuring each applied color filter to be individually selectable for each of the light source modules of the plurality of light source modules.

15. The method of claim 14, further comprising individually collecting and directing each of the filtered lights with the collimator lens provided with each of the plurality of light source modules.

16. The method of claim 15, further comprising configuring the collimator lenses such that the collimated light beam diverges with less than two degrees of spread.

17. A lighting system for generating an output collimated beam of light, the lighting system comprising:

a lighting subsystem having a plurality of light source modules, wherein each of the plurality of light source modules extends along an optical axis and includes:

a light source having a super-luminescent diode configured to emit light;

an optical lens configured to collect and direct the light from the light source and to output the light along an optical path that extends along the optical axis;

a color wheel assembly having a color wheel comprising a plurality of color filters, each color filter configured to be disposed adjacent to the optical lens and in the optical path of the light, the color filter disposed in the optical path of the light is configured produce a filtered light; and a collimator lens configured to collect and direct the associated filtered light to form a collimated light beam;

wherein the collimator lenses of the plurality of light source modules are configured to direct and output each of the associated collimated light beams into a major collective collimated light beam along a major optical axis, wherein each of the collimator lenses is fixed relative to the corresponding optical axis of the respective light source module; and wherein the collimator lenses of the plurality of light source modules are arranged such that the collimated light beams of the plurality of light source modules overlap and combine to form the collective major collimated light beam propagating along the major optical axis.

18. The lighting system of claim 17, wherein each of the light sources is a surface mounted device, and wherein the plurality of light source modules are tiled together to form the illuminator.

19. The lighting system of claim 18, wherein the optical lens is a bi-convex spherical lens.

20. The lighting system of claim 19, wherein the plurality of modules are coupled together to form a spot light or a search light.

* * * * *